United States Patent [19]

Kan

[11] 3,742,250

[45] June 26, 1973

[54] ACTIVE REGION LOGIC CIRCUIT

[75] Inventor: David T. Kan, Santa Clara, Calif.

[73] Assignee: Signetics Corporation, Sunnyvale, Calif.

[22] Filed: Apr. 7, 1971

[21] Appl. No.: 132,143

[52] U.S. Cl. .................. 307/237, 307/230, 307/300

[51] Int. Cl. .............................................. H03k 5/20

[58] Field of Search ..................... 307/230, 237, 300

[56] References Cited

UNITED STATES PATENTS

| | | | |
|---|---|---|---|
| 3,463,975 | 8/1969 | Baird | 307/317 |
| 3,153,152 | 10/1964 | Hoffman | 307/237 |
| 3,105,159 | 9/1963 | Ditkofsky | 307/300 |
| 3,092,729 | 6/1963 | Cray | 307/300 |
| 3,514,635 | 5/1970 | Gilbert | 307/237 |
| 3,497,724 | 2/1970 | Harper | 307/230 |
| 3,471,714 | 10/1969 | Gugliotti et al. | 307/230 |

OTHER PUBLICATIONS

"Hot Carrier Diodes Switch in Picoseconds" by Krakauer et al. Electronics, July 19, 1963 pp. 53–55

*Primary Examiner*—James W. Lawrence
*Assistant Examiner*—Harold A. Dixon
*Attorney*—Flehr, Hohbach, Test, Albritton & Herbert

[57] ABSTRACT

A logic gate including a transistor amplifier with back-to-back Schottky negative feedback diodes causes the input of the amplifier to form a current input summing junction. The Schottky diodes maintain the amplifier always in operating region with the output voltage swing limited by the diodes in each direction. The summing input junction provides weighted voting by use of input control signals of opposite polarity and of different weights.

5 Claims, 11 Drawing Figures

INVENTOR.
DAVID T. KAN
BY
Flehr, Hohbach, Test, Albritton & Herbert
ATTORNEYS

INVENTOR.
DAVID T. KAN

BY

Flehr, Hohbach, Test, Albritton & Herbert
ATTORNEYS

INVENTOR
DAVID T. KAN
BY
Flehr, Hohbach, Test, Albritton & Herbert
ATTORNEYS

INVENTOR.
DAVID T. KAN
BY
Flehr, Hohbach, Test, Albritton & Herbert
ATTORNEYS

INVENTOR.
DAVID T. KAN
BY
Flehr, Hohbach, Test, Albritton & Herbert
ATTORNEYS

INVENTOR.
DAVID T. KAN

BY

Fehr, Hohbach, Test, Albritton & Herbert
ATTORNEYS

INVENTOR.
DAVID T. KAN
BY
Flehr, Hohbach, Test, Albritton & Herbert
ATTORNEYS

ACTIVE REGION LOGIC CIRCUIT

BACKGROUND OF THE INVENTION

The present invention is directed to an active region logic circuit and more particularly to a circuit where the output voltage swing is limited and which is capable of providing weighted voting.

Almost all logic circuits in use today, such as the TTL, DTL, RTL and ECL require switching off and on at least one amplifier element. This produces significant voltage swings at both the input and output nodes of the amplifier. In medium scale integrated and large scale integrated circuits, capacitive loading of these nodes could be quite high due to the large number of fan-ins and fan-outs required. Therefore, large voltage swings of these nodes can seriously degrade the performance of the circuit and cause undesirable transients to be developed along power supply lines.

Furthermore, amplifiers and logic circuits of the above type, because of the large voltage swings, normally operate between cutoff and saturation. Turning on an amplifier from a cutoff state adds a significant amount of delay when the capacitive loading at the input node is high.

Moreover, logic circuits of the foregoing have been limited, due to response considerations, to fairly standard Boolean type functions.

OBJECTS AND SUMMARY OF THE INVENTION

It is, therefore, a general object of the invention to provide an improved logic circuit.

It is another object of the invention to provide a logic circuit which operates only in the active region of the active components in the circuit.

It is another object of the invention to provide a logic circuit as above which provides weighted voting.

It is another object of the invention to provide a logic circuit where the output voltage swing is maintained in the active range.

It is another object of the invention to provide a logic circuit as above which is ideally suited for a variety of logic functions in addition to classical Boolean functions.

In accordance with the above objects there is provided a logic circuit having "0" and "1" logic levels. The circuit comprises high gain amplifier means having an input and output. The output provides the logic levels and the amplifier has a predetermined active operating region. Negative feedback means are coupled between the output and input of the amplifier for maintaining it within its active operating region when its output is at either the "0" or "1" logic level.

DETAILED DESCRIPTION OF THE PREFERRED EMBODIMENT

Figure 1:
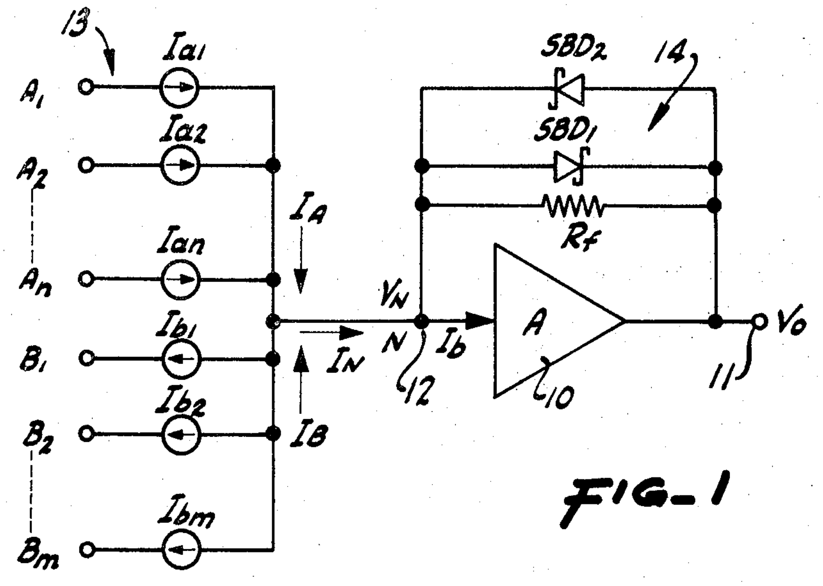
FIG. 1 is a simplified circuit schematic of a logic gate embodying the present invention.

FIG. 1 illustrates the basic schematic circuit embodying the present invention which is used as a building block in the remainder of the embodiments. In general, it includes a high gain amplifier 10, having an output terminal 11 with an output voltage which has "0" and "1" output logic levels and also an off logic level. The input 12 designated $V_N$ is driven by control signal means 13 which provides a summing current $I_N$ to input or node 12. Control signal means 13 includes a number of A inputs $A_1$ through $A_n$ which are shown as current sources $I_{al}$ through $I_{an}$ having one direction or polarity and B inputs, $B_1$ through $B_m$ which includes current sources $I_{bl}$ to $I_{bm}$ which are of the opposite direction or polarity to the A current sources.

Negative feedback means 14 are coupled between the output 11 and input 12 of amplifier 10 for maintaining the amplifier within its active operating region when the output is at either its "0" or "1" logic level. The feedback means include back-to-back connected Schottky type diodes $SBD_1$ and $SBD_2$. In addition, a feedback resistor $R_f$ is provided between the output and input of amplifier 10 for better dynamic response and to prevent ringing.

In operation the Schottky diodes $SBD_1$ and $SBD_2$ act as clamp diodes which set limits of the "0" and "1" output logic levels respectively. Since the diode drop of a Schottky diode is approximately 0.4 volts, and the typical diode or base emitter voltage drop of an integrated transistor is 0.6 volts, the Schottky diodes prevent any transistor in the amplifier 10 from going into the cutoff or saturation. Thus, the Schottky diodes (or for that matter, any type of diode which has a diode drop less than the transistor diode drop) prevents a charge storage effect in the amplifier 10 to provide for improved response time.

Moreover, the Schottky diodes cause node 12 to appear as a virtual ground which thus makes it a good approximation of a current summing junction for the currents from current sources 13.

The feedback resistor $R_f$ is chosen such that the input current, $I_b$, to amplifier is neglibible compared to the Schottky forward $V_{SB}$. When the input current $I_N$ is equal to "0" the output voltage is $$V_o = V_N + i_b R_f \approx V_N \quad (1)$$

When the input current is greater than "0" in the direction as shown and the product of the input current, $I_N$, and $R_f$ is greater than $V_{SB}$, then $SBD_1$ is in clamp. The output is at "0" logic level and the output voltage is determined by $$V_o = V_N - V_{SB} \quad (2)$$

On the other hand, when the input current is negative or less than "0" and the absolute product of $I_N$ and $R_f$ is greater than $V_{SB}$, then $SBD_2$ is in clamp and the output is a "1" with the output voltage being $$V_o = V_N + V_{SB} \quad (3)$$

Thus, the output logic swing is $2V_{SB}$ centered around $V_N$. $V_N$ is also the threshold level as well as the off level corresponding to the condition $I_N = 0$. The shunt feedback logic gate of the present invention therefore has three logic levels; namely, "0," "1" and "off."

A change of output logic state from "0" to "1" or vice versa corresponds to a change in direction of the summing current $I_N$. That is, the summation of the A current inputs, $I_A$, with the B current inputs, $I_B$. The resultant output logic state is then a function of the weight or magnitudes of $I_A$ and $I_B$. Therefore, the output $V_o$ in some situations will be described by conventional Boolean algebra where the A input or B input are acting separately to provide "0" and "1" outputs respectively. However, in the case where the weight of the A input is greater or less than that of the B input the operation cannot be described completely by Boolean algebra. This is because the operation depends upon the respective weights or magnitudes of these inputs.

When the weights are equal the output is arbitrarily chosen to be "1" although it can be chosen to be "0" or even an off state. This is normally done by providing an additional current source or sink in one of the A or B inputs.

Figure 2:
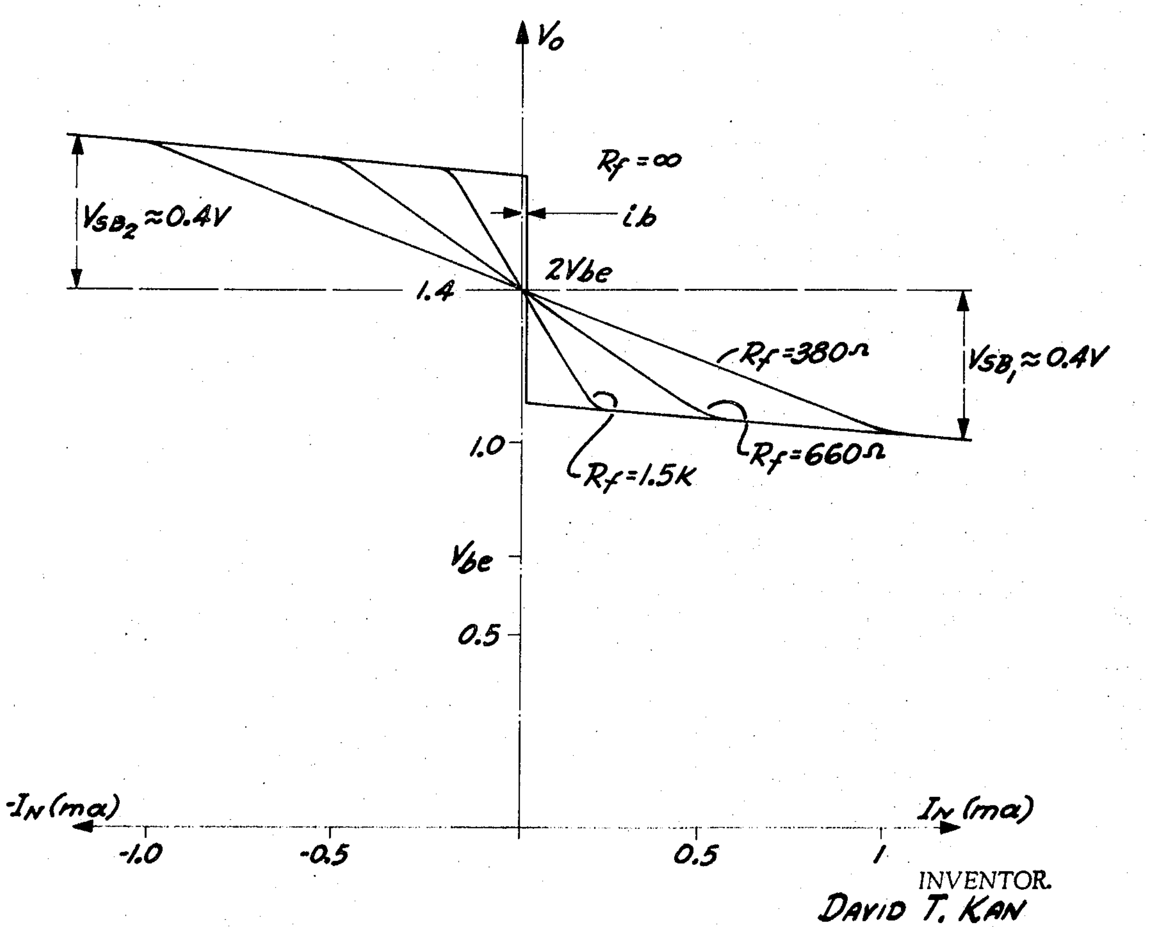
FIG. 2 is a set of characteristic curves useful in understanding the circuit of FIG. 1.

FIG. 2 illustrates the transfer characteristics of the circuit of FIG. 1 as a function of $R_f$. The circuit becomes an ideal current comparator when $R_f$ approaches infinity and $I_b$ approaches "0." However, as $R_f$ approaches "0" the stability of the circuit decreases.

From the above it is apparent that the circuit of FIG. 1 may serve as a building block for a number of basic logic gate configurations which will now be described.

Figure 3:
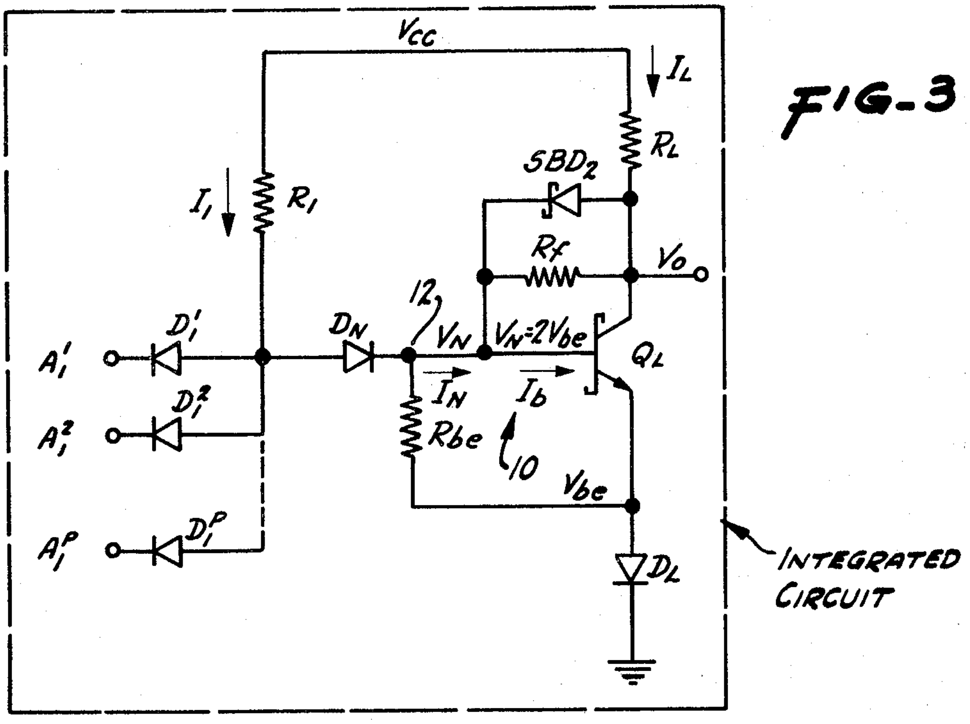
FIG. 3 is a schematic circuit of a NAND gate embodying the present invention.

A NAND gate is illustrated in FIG. 3 which embodies the circuit of FIG. 1. However, only the Schottky diode $SBD_2$ is shown separately with the diode $SBD_1$ being combined in the Schottky clamp transistor $Q_L$. NAND gate has representative inputs designated $A_1^1$ through $A_1^P$ with accompanying steering diodes $D_1^1$ through $D_1^P$. $V_{cc}$ coupled through resistor $R_1$ supplies the current $I_1$. The diode $D_N$ is coupled between node 12 of amplifier 10 and the NAND gate input. Voltage source $V_{cc}$ also supplies the current $I_L$ to amplifier 10 through resistor $R_L$. A resistor $R_{be}$ is coupled between node 12 and the emitter of $Q_L$. A diode $D_L$ couples the emitter to ground and provides for TTL compatibility.

Because of the circuit configuration $Q_L$ and $D_L$ always conduct. Since they are made geometrically equal, the node voltage $V_N$ is equal to two diode drops; that is; the base emitter drop across $Q_L$ and the diode drop of $D_L$ provide $2V_{be}$. When all A inputs are high, for example, $2V_{be} + 200mV$, $I_1$ flows through diode $D_N$ into node 12. $I_1$ is chosen to be greater than $$V_{be}/R_{be} + V_{SB}/R_f + i_b \quad (4)$$

so that $SBD_1$ (which is a portion of $Q_L$) is in clamp. The output is at a "0" logic level and $$V_o = 2V_{be} - V_{SB} \quad (5)$$

When any one of the A inputs is low, for example, $2V_{be} - 200mV$, $I_1$ flows out to that input diode $D_1$ and $V_N$ is cut off. $I_N$ is then negative and equal to $$-V_{be}/R_{be} \quad (6)$$

The value of $R_{be}$ is chosen so that the absolute value of the ratio of $V_{be}$ and $R_{be}$ is greater than $$V_{SB}/R_f - i_b \approx V_{SB}/R_f \quad (7)$$

$SBD_2$ is now in clamp and the output level at $V_o$ is a logic level "1" which is $$V_o = 2V_{be} + V_{SB} \quad (8)$$

Thus, the output logic level swings between a $+V_{SB}$ and a $-V_{SB}$ around $V_N$ which is equal to two diode drops. The Boolean expression for this circuit is $$Y = \overline{A_1^1 A_1^2 \ldots A_1^P} \quad (9)$$

Assuming the nominal forward drop of each Schottky diode is approximately $400mV$, the output logic swing is approximately $800mV$ or $\pm 400mV$ with respect to $2V_{be}$. The "0" anu"1" logic levels are relatively insensitive to power supply level variations and component tolerances. They are, however, strongly dependent upon temperature. Therefore, as long as all circuits are on the same semiconductor chip, the integrated circuit being indicated by the dashed line around the circuit of FIG. 3, variations of threshold levels among the gates with temperature tend to track. The net result is that only the peak-to-peak logic swing varies with temperature. This variation is a function of the temperature coefficient of the Schottky diodes and the various collector and sub-collector resistances associated with the circuit.

Since the diode drop of the diode $D_L$ is one of the important factors in determining the output level, $V_o$, the temperature variation can be reduced where a number of logic circuits are coupled to the same buss by making $D_L$ common to all of the various circuits. Thus, only the temperature coefficients of a single Schottky diode and the transistor $Q_L$ which provides the other diode drop will contribute to the overall temperature coefficient.

Figure 4:
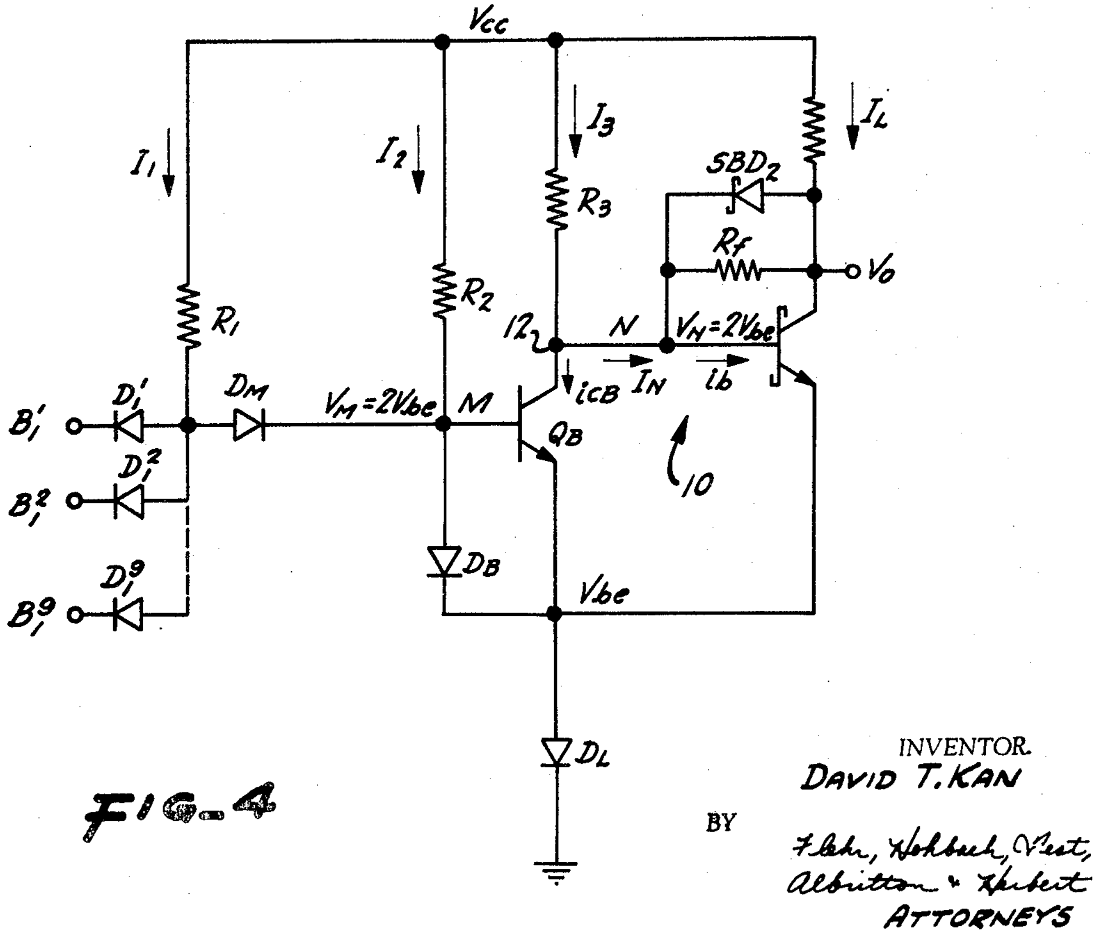
FIG. 4 is a schematic circuit of an AND gate embodying the present invention.

FIG. 4 is similar to FIG. 3 but instead shows an AND gate function instead of a NAND gate function. Thus, an additional stage of inversion is required for the AND function and this is provided by a diode bias current source consisting of diode $D_B$, transistor $Q_B$ coupled to the emitter of $Q_L$ along with the resistor $R_2$ coupled to $V_{cc}$. $Q_B$ is essentially a grounded emitter amplifier driven by a low impedance diode $D_B$. In essence the diode bias current source inverts the current $I_1$. Node M at the base input of $Q_B$ is normally at $2V_{be}$ which as discussed above is a point of virtual ground. Since $D_B$ and $Q_B$ have the same geometry, the diode current through $D_B$ and the collector current of $Q_B$ are approximately equal.

In operation when any one of the inputs $B_1^1$ through $B_1^9$ is low, diode $D_M$ is cut off so that the collector current $i_{CB}$ is substantially equal to $I_2$. $R_3$ is chosen so that $(I_3 - I_2 - I_b)R_f$ is greater than $V_{SB}$ and $SBD_1$ is in clamp. The output is at a "0" logic level and the output voltage is equal to two diode drops minus the Schottky diode drops or $2V_{be} - V_{SB}$. When all inputs are high $I_1$ adds to $I_2$ making $i_{CB}$ equal to their sum. It is assumed that $(I_1 + I_2 - I_3 + i_B)R_f$ is greater than $V_{SB}$, and $SBD_2$ is now in clamp. The output is a "1" and $V_o$ equals $2V_{be} + V_{SB}$. The Boolean expression of this circuit is therefore $$Y = B_1^1 B_1^2 \ldots B_1^q \quad (10)$$

Figure 5:
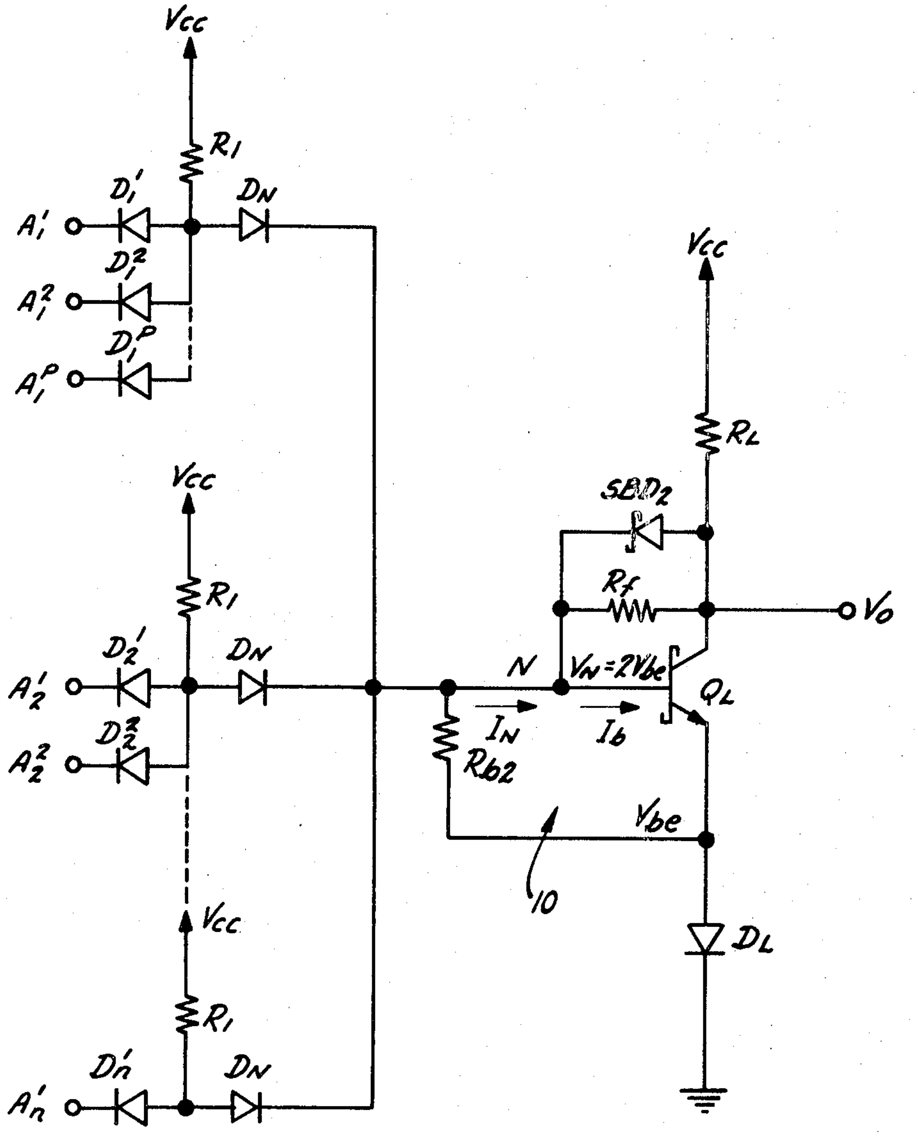
FIG. 5 is a schematic circuit of an AND/OR invert gate embodying the present invention.

FIG. 5 illustrates an AND-OR invert gate where since the node N is a point of virtual ground, it is an ideal point for performing the OR function. Since the voltage swing at this node is very small, typically 30 $mV$, the added capacitance at the ORing junction or the node N, has a relatively minor effect on the performance of the circuit. The Boolean expression for this circuit is $$Y = \overline{A_1^1 A_1^2 \ldots A_1^p + A_2^1 A_2^2 + \ldots A_n^1} \quad (11)$$

A noninverting or pure AND-OR gate can be formed from FIG. 5 by inserting an inversion circuit as for example, the diode bias current source of FIG. 4 in the same manner as illustrated in FIG. 4.

Figure 6:
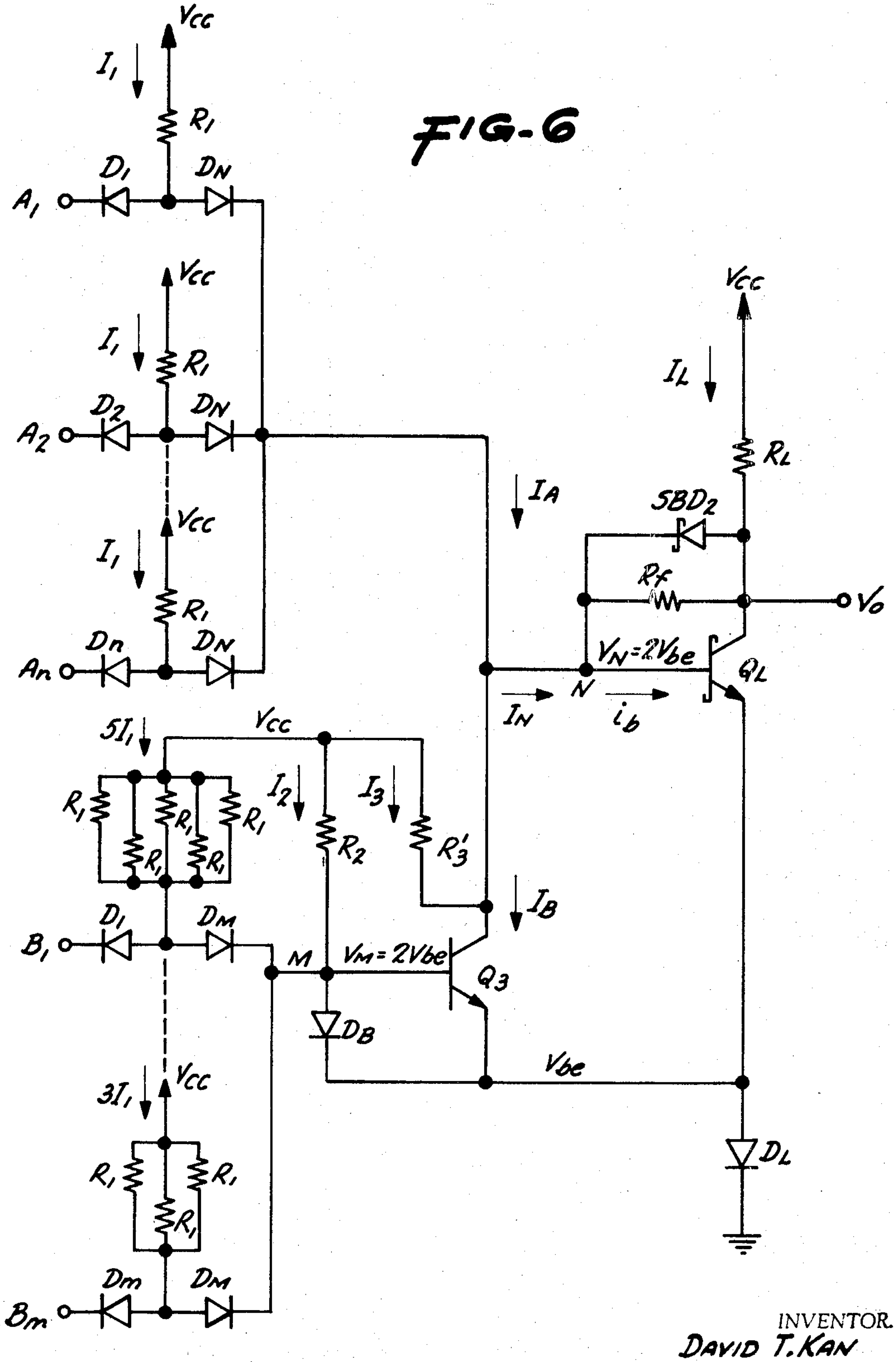
FIG. 6 is a schematic circuit of an AND/NAND voting gate embodying the present invention.

When the input circuits for the AND-OR Invert gate of FIG. 5 and its AND-OR modification are combined together with the amplifier of the present invention, the resulting circuit as illustrated in FIG. 6 — an AND/-NAND voting gate. In other words, this circuit exhibits voting characteristics and is essentially a current comparator. The currents which are being compared are from the $A$ inputs; namely the $I_A$ currents which are in one direction and the currents produced by the $B$ input which are designated $I_B$ and in an opposite direction. This was explained in conjunction with FIG. 1. Thus, the output logic state is dependent on the magnitude or weight of the inputs.

For example, each A input provides a current of one unit weight that flows into node N. This current is equal to $$I_1 = V_{cc} - 3V_{be}/R \quad (12)$$

The B inputs, on the other hand, provide currents of different weight that flow out of the node N or in the direction as shown by $I_B$. Specifically, the B inputs may have their unit weight increased by merely adding additional resistors $R_1$ in parallel. Thus, the $B_1$ input has a $5I_1$ current and the $B_m$ input a $3I_1$ current. The diode biased current source in addition to serving as an inverter provides small standby currents of $I_2$ and $I_3$ for maintaining $D_B$ and $Q_B$ on at all times. If these two standby currents are made equal, their effect on the "weight" of the B input currents may be neglected, since $I_B$ equals "0" when all B inputs are low. The operation of the circuit can be described as follows:

When $I_{AT} > I_{BT}$, the output is a "0", and $V_o = 2V_{be} - V_{SB}$.

When $I_{AT} < I_{BT}$, the output is a "1", and $V_o = 2V_{be} + V_{SB}$.

When $I_{AT} = I_{BT}$, the equal weight condition, the output is in the "off" position, and $V_o \approx 2V_{be}$.

It is seen that the present circuit performs a voting function and thus its operation cannot be described by Boolean algebra. It, therefore, can perform logic functions that conventional logic circuits cannot perform while still perserving basically a one gate time delay.

Figure 7:
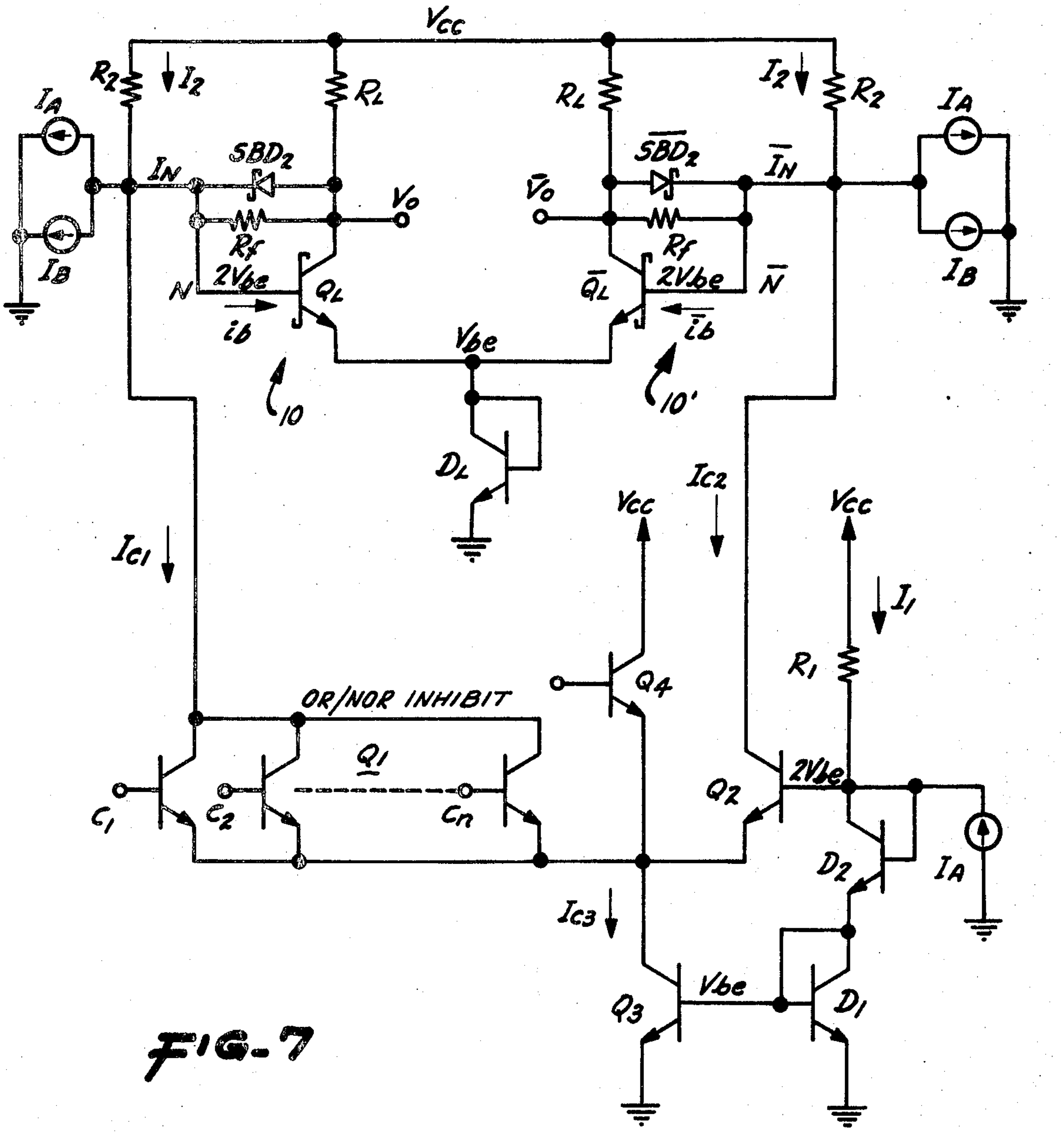
FIG. 7 is a schematic circuit of a conglomerate voting gate embodying the present invention.

FIG. 7 illustrates a conglomerate voting gate with OR/NOR functions. Complementary outputs $V_o$ and $\overline{V_o}$ are provided in conjunction with the amplifiers 10 and 10'. Both Schottky clamp amplifiers $Q_L$ and $\overline{Q_L}$ share the same bias diode $D_L$. The input currents $I_N$ and $\overline{I_N}$ to the amplifier are the algebraic sums respectively of $I_2$ and $I_{c1}$ and $I_2$ and $I_{c2}$. $Q_3$ and $D_1$ are connected to form a diode biased current source for the purpose of inversion. $I_{c3}$ is approximately equal to $I_1$ and $I_{c1}$ is approximately equal to $I_{c2}$ which in turn also is approximately equal to $I_1$. The base of $Q_2$ is connected to the threshold level of $2V_{be}$.

The $Q_1$ transistors having inputs $C_1$ through $C_n$ form in essence an OR logic input. The output at $Q_L$ provides the OR function and that at $\overline{Q_L}$ provides the NOR function. The Boolean expressions at these outputs are respectively $$Y = C_1 + C_2 \ldots C_n \quad (13)$$

$$Y = \overline{C_1 + C_2 \ldots C_n} \quad (14)$$

In operation, when any of the $C$ inputs is high, $Q_1$ is on (in other words, that transistor related to that input) and $Q_2$ is off. $I_{c1}$ is approximately equal to $I_1$ and $I_{c2}$ is equal to "0." If $R_2$ is chosen such that $$(I_{c1} - I_2)R_f > V_{SB} \quad (15)$$

then $I_N$ is negative and $SBD_2$ is in clamp. The output of the collector $Q_L$ is a "1" and $$V_o = 2V_{be} + V_{SB} \quad (16)$$

If $I_2 R_f$ is greater than $V_{SB}$, $\overline{Q_L}$ is in clamp. The output at the collector of $Q_L$ is a "0" and $$\overline{V_o} = 2V_{be} - V_{SB} \quad (17)$$

When all the C inputs are low, all $Q_1$ transistors are off and $Q_2$ is on. The output states are then reversed. The output of $\overline{Q_L}$ provides the NOR function.

Figure 8:
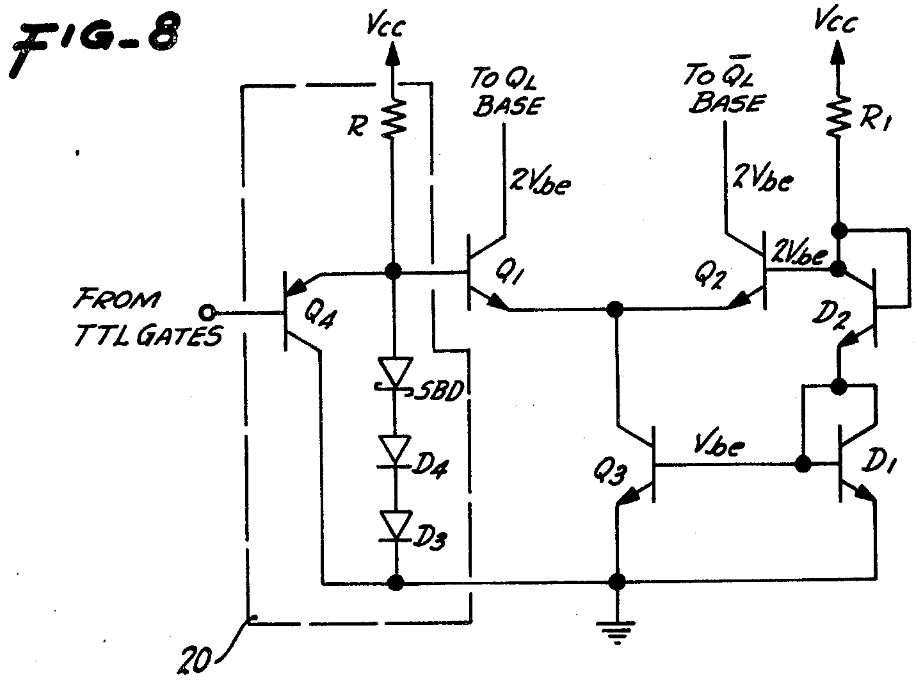
FIG. 8 is a schematic circuit of a TTL input buffer useful in conjunction with the present invention.

The present circuit is fully compatible with the NAND and AND gates discussed previously. However, it cannot be driven by TTL circuits directly because its input level is higher than $2V_{be} + V_{SB}$ and this would saturate the transistor $Q_1$. Interface circuits with TTL's will be discussed in conjunction with FIG. 8.

Although the input structure of the present circuit of FIG. 7 resembles that of a current mode switch, an important difference is that the voltage swings at the collectors of $Q_1$ and $Q_2$, typically 30mV, are at least an order of magnitude less than those found in the corresponding collectors of current mode switches. This is due to the very low input impedance of the feedback amplifiers 10 and 10'. As pointed out previously these are at a point of virtual ground. The collectors of $Q_1$ and $Q_2$ therefore are not sensitive to capacitive loading and more importantly the inputs are practically free from Miller type feedback.

The circuit of FIG. 7 can be used for conglomerate functions by utilizing as additional input nodes the base of $Q_2$ and the N nodes. Thus, an $I_A$ source is coupled to the base of $Q_2$ and weighted $I_A$ and $I_B$ sources of opposite polarity are coupled to the N nodes of $Q_L$ and $\overline{Q_L}$. Transistor $Q_4$ is for the purpose of inhibiting the OR/-NOR function by disabling $Q_1$ and $Q_2$ so that when its base is held at a voltage level higher than $2V_{be} + V_{SB}$, both inputs $V_o$ and $\overline{V_o}$ can be low simultaneously.

Except for the OR/NOR configuration all of the configurations shown in the present invention can be driven directly by a standard TTL series gate. However, for an OR/NOR configuration the circuit of FIG. 8 must be used. In other words, the C inputs of FIG. 7 when driven by a standard TTL circuit require the driving circuit shown in the dashed block 20. This places the input to the base of $Q_1$ at two diode drops, namely $D_3$ and $D_4$ and in addition a Schottky diode drop $V_{SB}$. With this configuration, the input to the base of $Q_4$ from standard TTL gates can be driven as hard as desired but the base input to $Q_1$ is unaffected since it is clamped at the abovementioned level.

Figure 9:
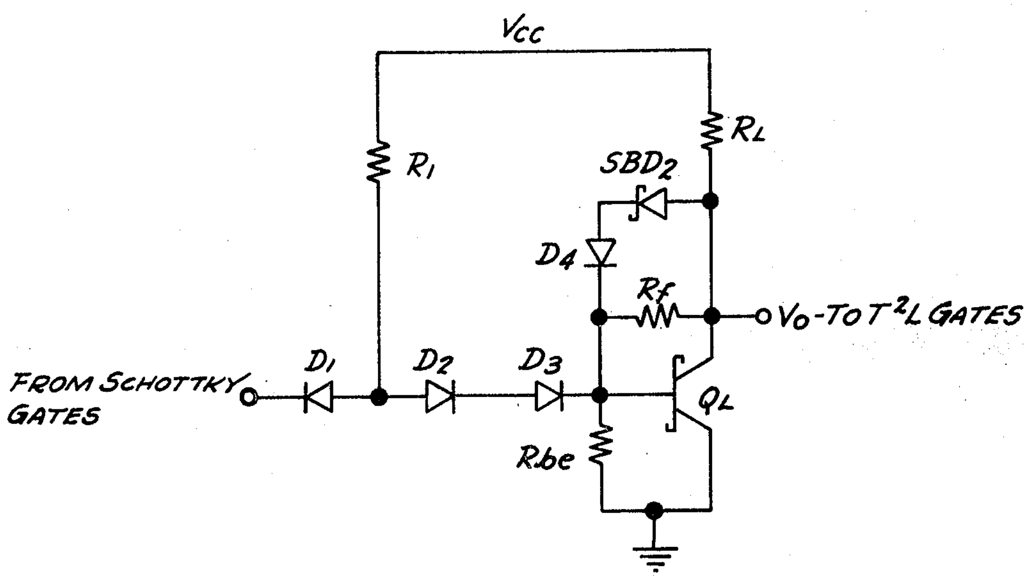
FIG. 9 is a schematic circuit of a TTL output buffer useful in understanding the present invention.
Figure 10:
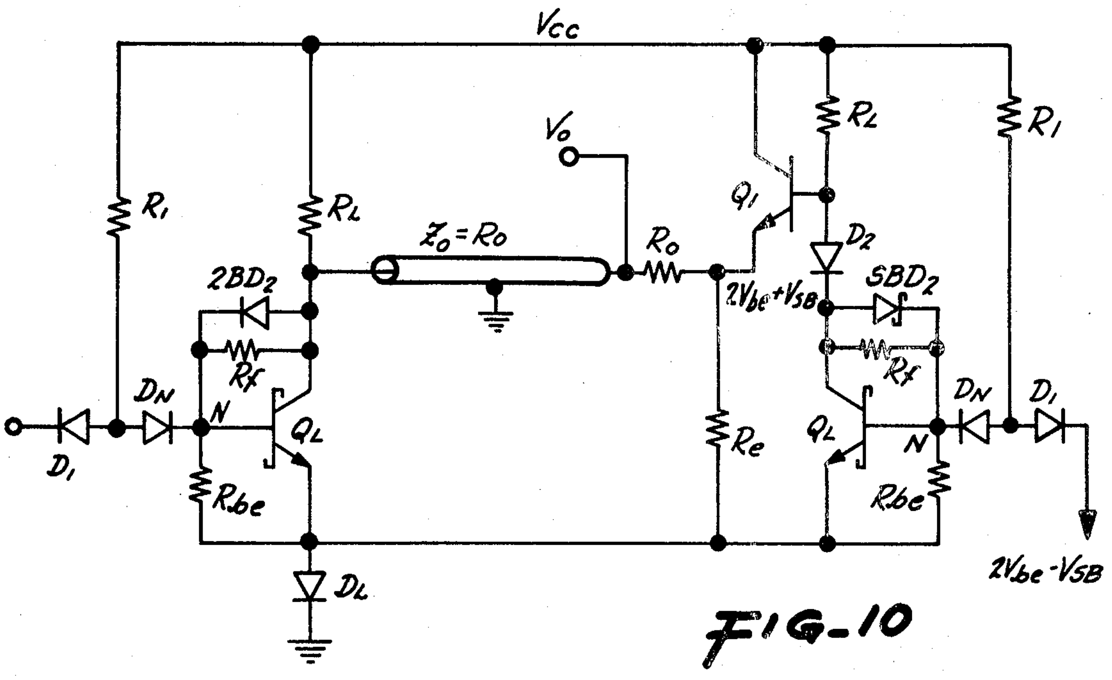
FIG. 10 is a schematic circuit illustrating how the present invention is useful in terminating a transmission line driver.

Although the entire family of the Schottky clamp logic gate shown in the present invention can drive non-Schottky type TTL gates, with reduced noise margins, modifications of the basic circuit may be made for high quality operation. Thus, a TTL interface circuit is shown in FIG. 9. Here an additional diode $D_4$ causes one output logic level to be the normal $2V_{be} + V_{SB}$. By eliminating the standard diode $D_L$ on the emitter of $Q_L$ the other output logic level is $V_{be} - V_{SB}$. Since the threshold of a TTL circuit is usually $2V_{be}$ the foregoing change removes a possible error condition.

Where the high speed logic gates are required to drive transmission lines which are terminated on one end only, the logic gate of the present invention could be used both on the driving and terminating ends of the transmission line. This is illustrated in FIG. 10 where since the logic gate of the present invention favors sinking currents when its node N is at $2V_{be} + V_{SB}$ it may be coupled to the terminating resistor $R_0$. Thus, very little or no current will flow through $R_0$ when the input driving gate is high. On the other hand, the receiving gate source which is on the right side of FIG. 10 is a gate which favors sourcing currents. Therefore, it is ideally suited for driving a transmission line with the terminating resistor, $R_0$, returned to a voltage source equal to $2V_{be} - V_{SB}$. This is simply the left side of FIG. 10 including the Schottky diode $SBD_2$ and Schottky clamp transistor $Q_L$ biased in the low state. Thus, the Schottky type gate for the present invention can serve either as line drivers or as terminating voltage sources.

Figure 11:
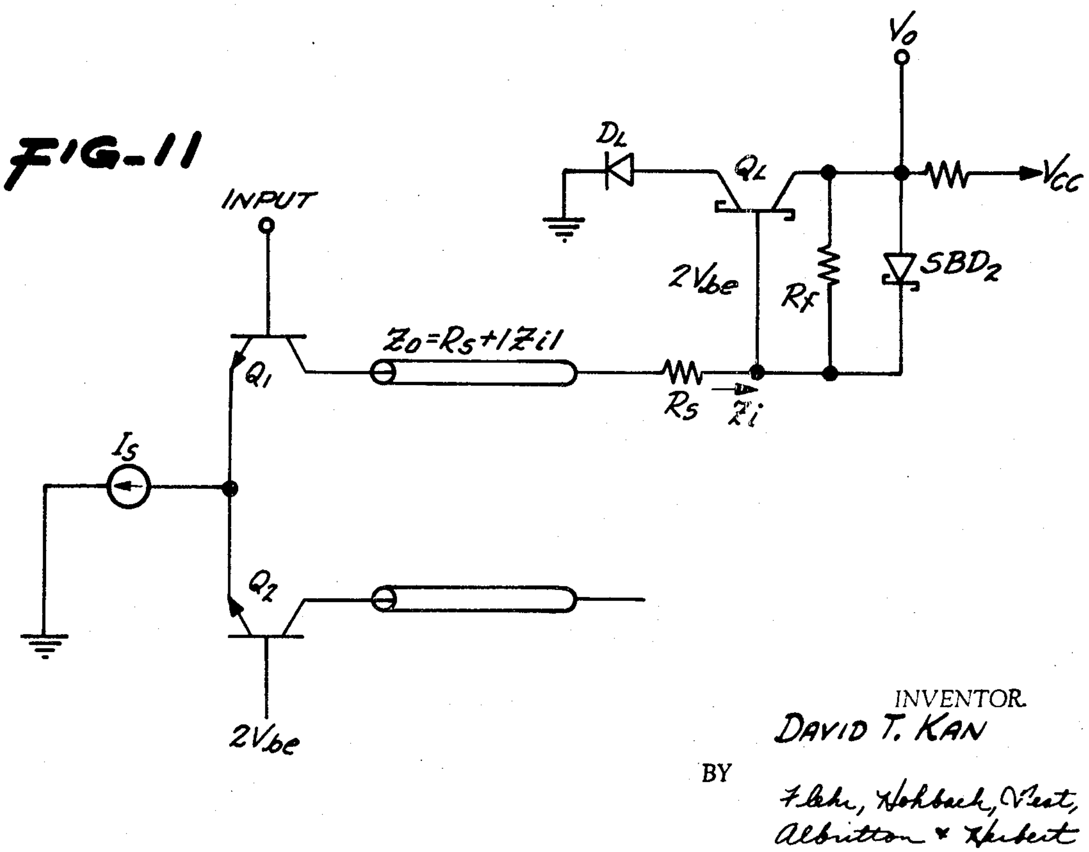
FIG. 11 is a schematic circuit showing how the present invention is useful in series terminating a transmission line.

A third mode for driving transmission lines which does not add additional power to the circuit is illustrated in FIG. 11. Here a Schottky clamp gate series terminates the transmission line designated $Z_0$. The characteristic impedance of the line $Z_0$ is made equal to the input impedance of the $Z_i$ of the amplifier $Q_L$. When $Z_i$ is not a constant resistance, a series resistor $R_s$ is added to $Z_i$ to reduce the effect of mismatch. However, the range of $R_s$ is very limited since $Q_1$ and $Q_2$ are already near saturation.

Thus, the present invention provides an improved logic gate which operates in the active region and which is capable of conglomerate and non-Boolean type logic functions. This is accomplished with a relatively rapid response time.

I claim:

1. A logic circuit having "0" and "1" output logic levels comprising: high gain amplifier means including transistor means having an input and output, such output providing said output logic levels, said transistor means having a predetermined active operating region; negative feedback means including a pair of Schottky type diodes parallel connected with the anode of one diode coupled to the cathode of the other and vice versa, said diodes coupled between said output and input, said diodes having a diode drop substantially lower than the diode drop of said transistor means for maintaining said transistor means within said active operating region when said output is at either said "0" or "1" logic level, said diodes clamping said output at said "0" or "1" logic levels, said diodes causing said input to appear as a virtual ground whereby said input serves as a current summing junction; and control signal means coupled to said input including a first current source for producing a current signal of one polarity and a first magnitude and a second current source for producing a current signal of opposite polarity and a second magnitude, said current signals being algebraically summed at said input, a summed signal of one polarity providing a "1" output logic level and a summed signal of the opposite polarity providing a "0" logic level whereby the resultant output logic level is a function of the magnitudes of the input current signals.

2. A logic circuit as in claim 1 where said first and second current sources each include at least two diodes and a resistor.

3. A logic circuit as in claim 1 including a feedback resistor, $R_f$, coupled between said output and input and where said diodes have a forward voltage drop, $V_{SB}$, said circuit having an output level of "1" or "0" when the absolute product of said summed current of one polarity or the opposite polarity and $R_f$ is greater than $V_{SB}$.

4. A logic circuit as in claim 1 where said output has a third logic state which is off and is a predetermined voltage level and where said "0" and "1" levels are relatively higher and lower than said predetermined voltage by the amount of the diode drop of said parallel connected diodes.

5. A logic circuit as in claim 4 where said amplifier means includes transistor and diode means series connected to provide that said predetermined voltage level has a magnitude of two diode drops whereby said output is transistor-transistor logic (TTL) compatible.

* * * * *